United States Patent [19]

Rask et al.

[11] Patent Number: 5,001,589
[45] Date of Patent: Mar. 19, 1991

[54] TUNGSTEN AND TANTALUM DIFFUSION BARRIERS FOR METAL-IN-GAP MAGNETIC HEADS

[75] Inventors: Mats T. Rask, Minneapolis; Leroy L. Longworth, Waconia, both of Minn.

[73] Assignee: Seagate Technology, Inc., Scotts Valley, Calif.

[21] Appl. No.: 359,162

[22] Filed: May 31, 1989

[51] Int. Cl.$^5$ .................... G11B 5/235; G11B 5/147
[52] U.S. Cl. ...................................... 360/120; 360/126
[58] Field of Search ............. 360/120, 125, 126, 119, 360/121

[56] References Cited

U.S. PATENT DOCUMENTS

| | | |
|---|---|---|
| 3,987,487 | 10/1976 | Berger . |
| 3,999,216 | 12/1976 | Berchtold . |
| 4,025,379 | 5/1977 | Whetstone ........................... 360/126 |
| 4,101,348 | 7/1978 | Berchtold . |
| 4,168,445 | 9/1979 | Hatch . |
| 4,182,643 | 1/1980 | Calderon, Jr. et al. . |
| 4,217,541 | 8/1980 | Weintraub et al. . |
| 4,217,613 | 8/1980 | Schwartz . |
| 4,251,297 | 2/1981 | Kawabata et al. . |
| 4,251,842 | 2/1981 | Iwasaki et al. . |
| 4,257,830 | 3/1981 | Tsuya et al. . |
| 4,320,427 | 3/1982 | Bogen . |
| 4,327,873 | 5/1982 | Juppet et al. . |
| 4,361,860 | 11/1982 | Nozawa . |
| 4,417,200 | 11/1983 | Weintraub et al. . |
| 4,435,212 | 3/1984 | Ueshima et al. . |
| 4,488,195 | 12/1984 | Yanagiuchi et al. . |
| 4,576,876 | 3/1986 | Shiiki et al. . |
| 4,577,250 | 3/1986 | Sato et al. . |
| 4,578,728 | 3/1986 | Sakakima et al. . |
| 4,590,530 | 5/1986 | Sakakima et al. . |
| 4,618,901 | 10/1986 | Hatakeyama et al. . |
| 4,649,307 | 3/1987 | Bech . |
| 4,652,954 | 3/1987 | Church ................................ 360/120 |
| 4,670,807 | 6/1987 | Gorter et al. . |
| 4,697,217 | 9/1987 | Matsuura et al. . |
| 4,704,788 | 11/1987 | Eckstein . |
| 4,709,284 | 11/1987 | Endo et al. . |
| 4,712,032 | 12/1987 | Hatch . |
| 4,713,709 | 12/1987 | Yasuda et al. . |
| 4,734,810 | 3/1988 | Nakayama et al. . |
| 4,742,412 | 5/1988 | Kuriyama . |
| 4,745,507 | 5/1988 | Otomo et al. . |
| 4,745,510 | 5/1988 | Watanabe et al. . |
| 4,748,089 | 5/1988 | Kumasaka et al. . |
| 4,750,070 | 6/1988 | Maruyama . |
| 4,755,898 | 7/1988 | Higashionji et al. . |
| 4,755,899 | 7/1988 | Kobayashi et al. . |
| 4,759,966 | 7/1988 | Shimozawa et al. . |
| 4,761,536 | 8/1988 | Blakeley . |
| 4,762,755 | 8/1988 | Shiiki et al. . |
| 4,764,832 | 8/1988 | Enz et al. . |
| 4,767,957 | 8/1988 | Hatch . |
| 4,768,118 | 8/1988 | Kuriyama ........................... 360/121 |
| 4,768,121 | 8/1988 | Nakashima et al. . |
| 4,769,729 | 9/1988 | Kumasaka et al. . |
| 4,769,899 | 9/1988 | Yasuda et al. . |
| 4,774,616 | 9/1988 | Kumasaka et al. . |
| 4,778,707 | 10/1988 | Arioka et al. . |
| 4,780,779 | 10/1988 | Pisharody et al. . |
| 4,783,711 | 11/1988 | Kitada et al. . |
| 4,887,177 | 12/1989 | Sillen ................................... 360/120 |
| 4,901,179 | 2/1990 | Satomi et al. ....................... 360/126 |

FOREIGN PATENT DOCUMENTS 1016005 1/1986 Japan ................................ 360/120

OTHER PUBLICATIONS

*Auger Spectroscopy Analysis of Metal/Ferrite Interface Layer In Metal-In-Gap Magnetic Head,* by K. Kajiware et al., Aug. 15, 1988, pp. 1–3.

*Permalloy/Senduct Metal-In-Gap Head,* by C. W. M. P. Silles et al., Magnetics, vol. 24, No. 2, Mar. 1988, pp. 1–3.

Primary Examiner—A. J. Heinz
Assistant Examiner—Jefferson Evans
Attorney, Agent, or Firm—Kinney & Lange

[57] ABSTRACT

A Metal-In-Gap (MIG) ferrite magnetic head has a ferrite core with a layer of high magnetic moment material (such as Sendust) deposited on one or both of the core faces. A thin barrier layer of tungsten or tantalum is positioned between the ferrite and the high magnetic moment material.

18 Claims, 2 Drawing Sheets

TUNGSTEN AND TANTALUM DIFFUSION BARRIERS FOR METAL-IN-GAP MAGNETIC HEADS

BACKGROUND OF THE INVENTION

1. Field of the Invention

The present invention relates to metal-in-gap (MIG) ferrite magnetic heads. In particular, the present invention relates to an improved MIG head having a thin barrier layer of tungsten or tantalum for suppression of secondary pulse effects.

2. Description of the Prior Art

The advent of high coercivity magnetic media has led to a renewed interest in metal-in-gap (MIG) ferrite magnetic heads In a metal-in-gap ferrite magnetic head, a layer of high magnetic moment material is deposited on the trailing edge core face to achieve improved write characteristics and consequently higher linear recording density. Improved read characteristics are achieved by use of a layer of high magnetic moment material on one or both core faces.

In one typical configuration, the ferrite cores are Mz-Zn ferrite, and the high magnetic moment material deposited on the core faces of the ferrite is an Fe-Si-Al based alloy known as Sendust.

It has been discovered that MIG heads exhibit a so-called "secondary electrical pulse", which appears to be produced at the location of the ferrite-metal interface. This is believed to be due to a chemical reaction between the metal (e.g., Sendust) and the ferrite (e.g., Mn-Zn ferrite) resulting in a magnetically dead reaction layer (i.e., a "secondary gap" or "pseudo gap") between the ferrite and the high magnetic moment metal. In Kajiwara et al, "Auger Spectroscopy Analysis of Metal/Ferrite Interface Layer in Metal-In-Gap Magnetic Gap", Intermag/MMM Conference, Vancouver, B.C., paper EE-11 (1988), it was reported that when the metal was Sendust, the reaction layer which apparently produces the secondary pulse is composed of $Al_2O_3$ and $SiO_2$. In addition, Kajiwara et al reported that using another high magnetic moment metal (an Fe-Ga-Si-Ru alloy) instead of Sendust resulted in a reaction layer composed of $Ga_2O_3$ and $SiO_2$. To reduce the secondary pulse problem, Kajiwara et al suggested the use of a thin silicon dioxide or silicon oxynitride barrier layer between the ferrite and the metal. It was reported by Kajiwara et al that these barrier layers reduced reaction between the metal and the Mn-Zn ferrite. The barrier layers appeared to be more efective when the metal was Fe-Ga-Si-Ru alloy than when the metal was Sendust.

The problem of the secondary gap in a metal-in-gap head was also discussed in Sillen et al, "Permalloy/Sendust Metal-In-Gap Head" IEEE Trans. On Mag., Vol. 24, No. 2, pp. 1802-1804 (1988), and in the Enz et al U.S. Pat. No. 4,764,832. The proposed solution in both of these references is a layer of permalloy (NiFe) between the ferrite core face and the Sendust layer. The thickness of this permalloy layer is between 500 and 20,000 Angstroms.

Eckstein U.S. Pat. No. 4,704,788 discusses the problem of pseudo gaps at the interface between the ferrite core and the Sendust layer of a MIG head. The Eckstein patent suggests a method of fabrication which includes depositing a thin adhering layer over the ferrite before depositing the Sendust alloy layer. The Eckstein patent does not disclose, however, the composition of the thin adhering layer.

Gorter et al U.S. Pat. No. 4,670,807 shows a MIG head and indicates that there are transition zones between each of the ferrite cores and the corresponding Sendust layers. The Gorter et al. patent suggests modifying relative thicknesses of the Sendust layers to achieve better frequency response. It is also suggested that transition zones be made of glass or titanium to serve for better bonding between the ferrite cores and the Sendust layers.

Kuriyama U.S. Pat. Nos. 4,742,412 and 4,768,118 describe MIG heads having a thin layer of chromium or titanium between a Sendust layer and a trailing ferrite core. This thin layer is between 200 to 500 Angstroms in thickness.

There is a continuing need for improved MIG heads which offer better suppression of secondary pulse phenomena than has been possible with the prior art approaches.

SUMMARY OF THE INVENTION

The present invention is an improved MIG head in which a thin barrier layer of a refractory metal (such as tungsten or tantalum) is formed between the ferrite core face and a metal layer of high magnetic moment material (such as Sendust). Both tungsten and tantalum form continuous films at very low thicknesses and provide an effective diffusion barrier between the ferrite and the high magnetic moment material. The diffusion barrier suppresses the formation of a reaction layer at the ferrite-Sendust interface which causes secondary pulse phenomena in conventional MIG heads.

DETAILED DESCRIPTION OF THE PREFERRED EMBODIMENTS

Figure 1:
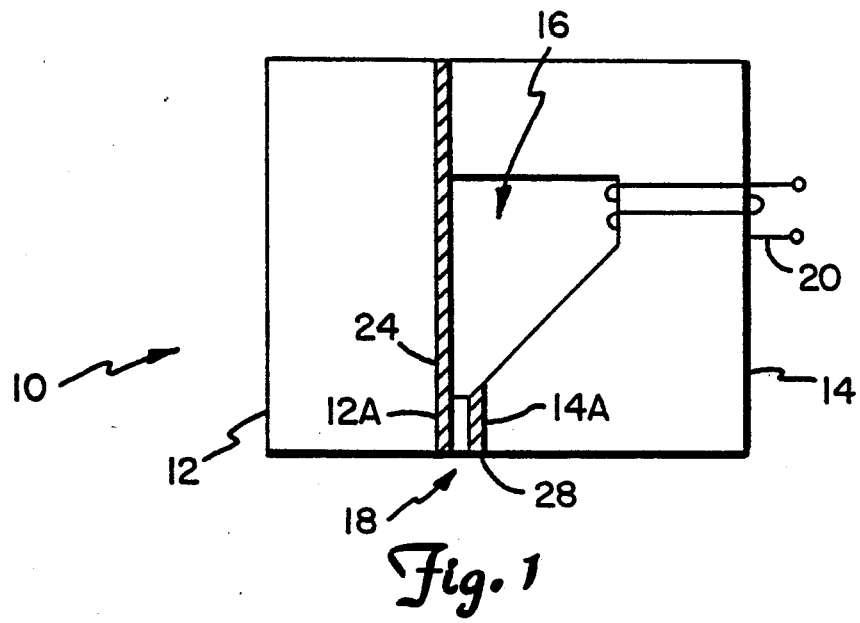
FIG. 1 is a side view of a MIG magnetic head of the present invention.

In FIG. 1, metal-in-gap (MIG) magnetic head 10 includes I-shaped ferrite member 12 and C-shaped ferrite member 14, which are joined together to define a transducer head having a winding aperture 16 and a transducer gap area 18. Coil 20 is wound around a portion of C-shaped ferrite member 14.

Figure 2:
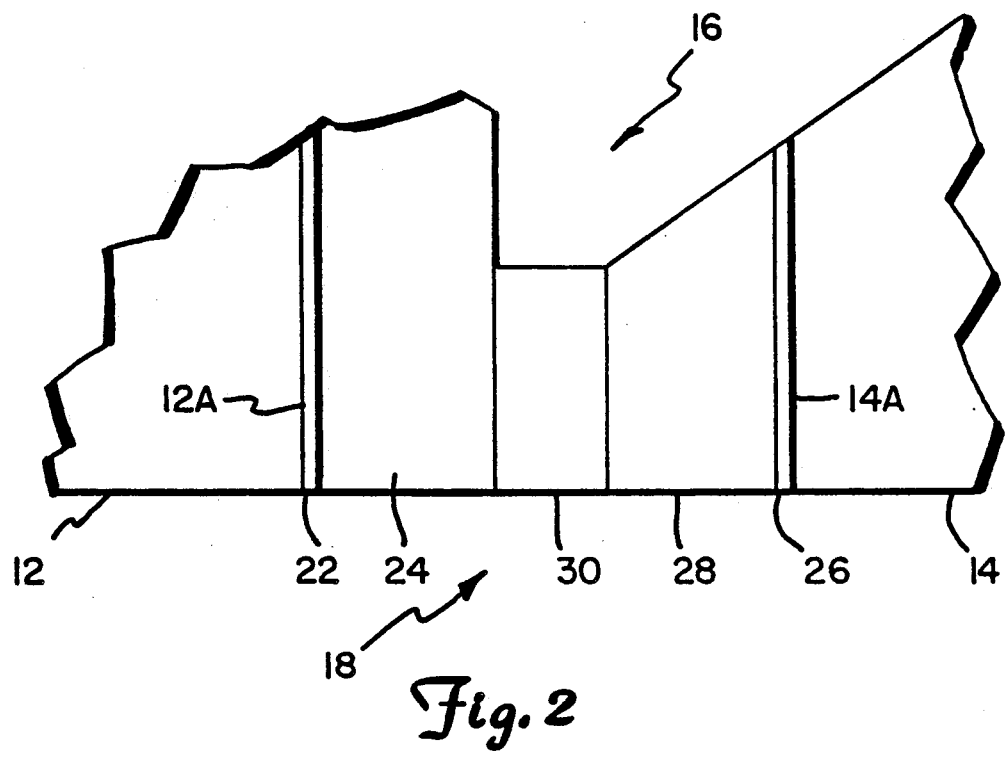
FIG. 2 is an enlarged partial view of the MIG magnetic head of FIG. 1 showing the gap area.

Gap area 18 of magnetic head 10 is shown in greater detail in FIG. 2. Face 12A of I-shaped core member 12 is covered by thin barrier layer 22. Layer 24 of a high compliance magnetic material such as Sendust is deposited over barrier layer 22.

Similarly, at opposite face 14A of C-shaped ferrite member 14, barrier layer 26 separates Sendust layer 28 from face 14A. Gap oxide 30 is formed between Sendust layers 24 and 28, and defines the primary gap of magnetic head 10.

The purpose of barrier layers 22 and 26 is to provide diffusion barriers to prevent the formation of reaction layers at the interfaces between ferrite 12 and Sendust layer 24 and between ferrite member 14 and Sendust layer 28. In the Kajawara et al and Sillen et al articles, and in the Enz et al patent, it is reported that in conventional MIG heads the formation of a non-magnetic reaction layer at the interface between a ferrite core and a Sendust layer creates a secondary gap which produces secondary pulses. The secondary pulse phenomena degrades the overall performance of conventional MIG magnetic heads.

In the present invention, barrier layers 22 and 26 are formed of high melting point refractory metals: tungsten and tantalum. Both tungsten and tantalum form continuous films at very low thicknesses (as low as about 50 Angstroms). Both metals have high melting temperatures and do not undergo phase transformation in the temperature range in which MIG magnetic heads are typically processed (0° C. to about 900° C.).

With the present invention, barrier layers 22 and 26 have a thickness between about 50 and 150 Angstroms, and preferably are about 100 Angstroms thick. This has been found to be effective in significantly reducing secondary pulse phenomena.

Figure 3:
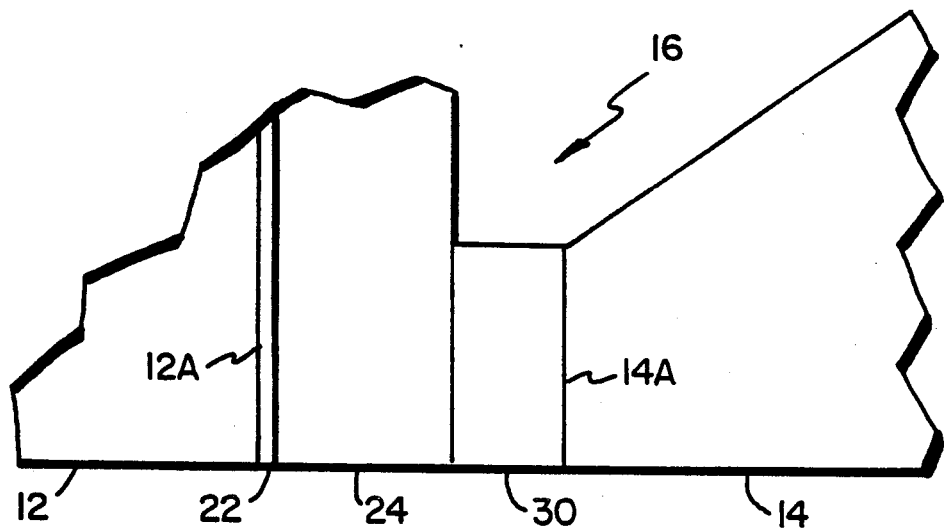
FIG. 3 shows another embodiment of the present invention, in which a high magnetic moment metal layer and a barrier layer are applied to only one face of a ferrite core.

FIG. 3 shows an alternative embodiment of the present invention which is similar to the embodiment of FIG. 2, and similar reference characters are used to designate similar elements. The embodiment of FIG. 3 differs from the embodiment of FIG. 2 in that there is only a single Sendust layer 24, which is separated from core face 12A by barrier layer 22. Gap oxide 30 separates Sendust layer 24 from core face 14A of C-shaped core member 14. Barrier layer 22 is a refractory metal (e.g., tungsten or tantalum) and has a thickness of between about 50 and 150 Angstroms.

Figure 4:
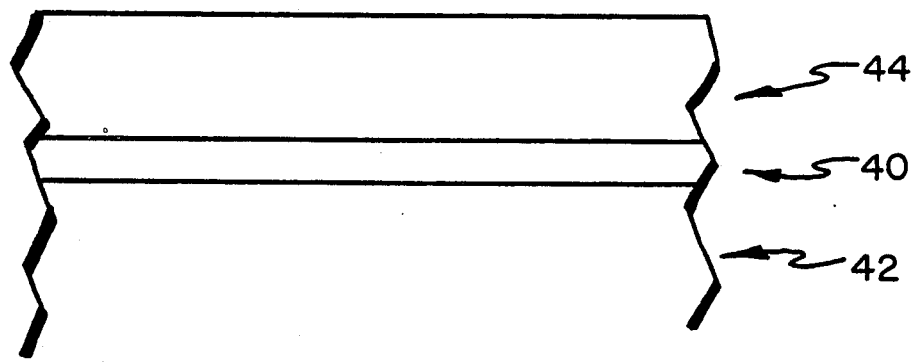
FIG. 4 is a diagram showing deposition of tantalum and tungsten barrier layers and Sendust layers over an Mn-Zn ferrite substrate for analysis of the effectiveness of the barrier layer using Auger electron spectroscopy.

To demonstrate the effectiveness of the tungsten and tantalum barrier layers, tests were performed using Auger electron spectroscopy. These tests measured the effect of barrier layers of different materials on interaction between components of a Mn-Zn ferrite substrate and a layer of Sendust. As illustrated in FIG. 4, barrier layer 40 was deposited on a surface of Mn-Zn substrate 42. A layer of Sendust 44 was then deposited over barrier layer 40.

In these tests, barrier layer 40 and Sendust layer 44 were deposited under zero stress conditions using sputter depositing techniques. Materials used for barrier layer 40 included tungsten, tantalum and permalloy. The tungsten and tantalum barrier layers used in the tests were 100 Angstroms thick. The permalloy barrier layers used in the tests were 250 Angstroms thick. The composition of the Sendust layer 44 was 83 % Fe, 11 % Si, and 6 % Al, and the thickness of the Sendust layer 44 was approximately 300 Angstroms. The samples formed in the fashion shown in FIG. 4 were subjected to thermal annealing at 650° C. for two hours. Auger electron spectroscopy was then performed on the samples. The analysis using Auger electron spectroscopy involved slowly sputtering off the deposited layers and analyzing them to determine which atomic species were present.

After the thermal annealing at 650° C. for two hours, both the 100 Angstrom thick tungsten barrier layer and the 100 Angstrom thick tantalum barrier layer had suppressed the formation of aluminum oxide at the Sendust-ferrite interface. In contrast, the permalloy (NiFe) barrier layer of 250 Angstroms thickness was not sufficient to prevent the formation of aluminum oxide at the interface.

MIG magnetic heads having the configuration shown in FIG. 3 were compared with similar MIG heads having no barrier layer and with standard ferrite heads which did not have an MIG configuration. The secondary pulse was measured as a ratio of the primary pulse produced by the head using a digitizing oscilloscope to observe both the primary and secondary pulses. The non-MIG heads tested had a configuration which should not produce any secondary pulse, and therefore provided an indication of the extent of noise in the measurement system.

The MIG heads (both with and without the barrier layer of the present invention) produced much improved electrical parametrical results compared to the non-MIG heads. This was expected, due to the addition of a layer of high magnetic moment material (Sendust). Significantly, the modified MIG heads of the present invention exhibited a secondary pulse which was suppressed significantly compared to the secondary pulse exhibited by the MIG heads without the barrier layer.

Based both on Auger electron spectroscopy tests and the electrical tests, the use of a thin layer of tungsten or tantalum as a diffusion barrier between a ferrite core face and a high magnetic moment material such as Sendust is particularly effective in preventing the formation of a reaction layer at the Sendust-ferrite interface which can cause secondary pulse phenomena.

Although the present invention has been described with reference to preferred embodiments, workers skilled in the art will recognize that changes may be made in form and detail without departing from the spirit and scope of the invention.

What is claimed is:

1. A magnetic head comprising:
   a first ferrite core member having a first face;
   a second ferrite core member having a second face positioned opposite and spaced from the first face;
   a first barrier layer of a refractory metal having a thickness of between about 50 Angstroms and about 150 Angstroms deposited on the first face;
   a first layer of high magnetic moment material deposited on the first barrier layer; and
   a non-magnetizable transducing gap material positioned between the first layer of high magnetic moment material and the second face.

2. The magnetic head of claim 1 wherein the refractory metal is tungsten.

3. The magnetic head of claim 1 wherein the refractory metal is tantalum.

4. The magnetic head of claim 1 wherein the first barrier layer has a thickness of about 100 Angstroms.

5. The magnetic head of claim 1 wherein the first layer of high magnetic moment material is an Fe-Si-Al alloy.

6. The magnetic head of claim 5 wherein the first ferrite core member is an Mn-Zn ferrite.

7. The magnetic head of claim 6 wherein the refractory metal is tungsten.

8. The magnetic head of claim 6 wherein the refractory metal is tantalum.

9. The magnetic head of claim 1 and further comprising:
   a second barrier layer of a refractory metal having a thickness of between about 50 angstroms and about 150 Angstroms deposited on the second face;
   a second layer of high magnetic moment material deposited on the second barrier layer; and wherein the non-magnetizable transducing gap material is positioned between the first and second layers of high magnetic moment material.

10. The magnetic head of claim 9 wherein the first and second barrier layers are tungsten.

11. The magnetic head of claim 9 wherein the first and second barrier layers are tantalum.

12. The magnetic head of claim 9 wherein the first and second layers of high magnetic moment material are Fe-Si-Al alloys.

13. A magnetic head comprising:
   a ferrite magnetic core having first and second core members with first and second faces facing each other, the fist face being provided with a cladding of a first layer of high magnetic moment material;
   a non-magnetizable transducing gap between the first and second faces.
   a winding around one of the core members; and
   a first metal diffusion barrier layer between the first face and the first layer of high magnetic moment material, the first metal diffusion barrier being of a metal from a group consisting of tungsten and tantalum.

14. The magnetic head of claim 13 wherein the first metal diffusion barrier has a thickness of between about 50 Angstroms and about 150 Angstroms.

15. The magnetic head of claim 13 wherein the first metal diffusion barrier is tungsten.

16. The magnetic head of claim 13 wherein the first metal diffusion barrier is tantalum.

17. The magnetic head of claim 13 wherein the high magnetic moment material is an Fe-Si-Al alloy.

18. The magnetic head of claim 13 and further comprising:
   a cladding of a second layer of a high magnetic moment material on the second face; and
   a second metal diffusion barrier layer between the second face and the second layer of a high magnetic moment material, the second metal diffusion barrier being of a metal from the group consisting of tungsten and tantalum.

* * * * *

UNITED STATES PATENT AND TRADEMARK OFFICE
CERTIFICATE OF CORRECTION

PATENT NO. : 5,001,589

DATED : March 19, 1991

INVENTOR(S) : Mats T. Rask et al.

It is certified that error appears in the above-identified patent and that said Letters Patent is hereby corrected as shown below:

Col. 5, line 14, delete "fist", insert --first--.

Signed and Sealed this

Fifteenth Day of September, 1992

Attest:

DOUGLAS B. COMER

*Attesting Officer*  *Acting Commissioner of Patents and Trademarks*